United States Patent
Ye et al.

(10) Patent No.: US 9,690,572 B2
(45) Date of Patent: Jun. 27, 2017

(54) SYSTEM AND METHOD FOR UPDATING FIRMWARE IN REAL-TIME

(71) Applicant: FREESCALE SEMICONDUCTOR, INC., Austin, TX (US)

(72) Inventors: Wanfu Ye, Shanghai (CN); Xuwei Zhou, Shanghai (CN)

(73) Assignee: NXP USA, INC., Austin, TX (US)

( * ) Notice: Subject to any disclaimer, the term of this patent is extended or adjusted under 35 U.S.C. 154(b) by 72 days.

(21) Appl. No.: 14/989,767

(22) Filed: Jan. 6, 2016

(65) Prior Publication Data

US 2017/0017485 A1   Jan. 19, 2017

(30) Foreign Application Priority Data

Jul. 17, 2015   (CN) .......................... 2015 1 0625898

(51) Int. Cl.
  *G06F 9/44*    (2006.01)
  *G06F 9/445*   (2006.01)
  *G06F 3/06*    (2006.01)

(52) U.S. Cl.
  CPC ............... *G06F 8/67* (2013.01); *G06F 3/064* (2013.01); *G06F 3/0614* (2013.01); *G06F 3/0673* (2013.01)

(58) Field of Classification Search
  CPC ...... G06F 3/0614; G06F 3/064; G06F 3/0673; G06F 8/65; G06F 8/67
  USPC .................................................. 717/168–173
  See application file for complete search history.

(56) References Cited

U.S. PATENT DOCUMENTS

| | | | |
|---|---|---|---|
| 4,802,119 A | 1/1989 | Heene | |
| 5,987,605 A * | 11/1999 | Hill | ......................... G06F 9/441 |
| | | | 713/100 |
| 6,463,549 B1 | 10/2002 | Shperber | |
| 6,760,908 B2 | 7/2004 | Ren | |
| 6,804,772 B2 | 10/2004 | Lee | |
| 6,931,477 B2 | 8/2005 | Oakley | |
| 7,039,776 B2 | 5/2006 | Wong | |
| 7,523,299 B2 | 4/2009 | Yu | |
| 7,739,469 B2 | 6/2010 | Jessani | |
| 8,495,618 B1 | 7/2013 | Inbaraj | |
| 8,713,559 B2 | 4/2014 | Fallon | |
| 2002/0010846 A1 | 1/2002 | Weber | |
| 2005/0162944 A1 * | 7/2005 | Ball | ..................... G06F 11/1666 |
| | | | 365/200 |
| 2008/0320203 A1 * | 12/2008 | Fitzgerald | ............. G06F 1/3225 |
| | | | 711/5 |
| 2009/0031107 A1 | 1/2009 | Henry | |
| 2009/0031121 A1 | 1/2009 | Henry | |

(Continued)

*Primary Examiner* — Qing Chen
(74) *Attorney, Agent, or Firm* — Charles E. Bergere (57) ABSTRACT

A system controlled by firmware includes a memory and a processor. The memory includes a first memory block for storing non-programmable code used for performing key functions, and second and third memory blocks for storing programmable code used for performing normal functions. During operation, one of the second and third memory blocks in which the programmable code is being executed is an active memory block. After receiving new programmable code, the processor identifies the inactive memory block, stores the new programmable code therein, and switches to execute the new programmable code while continuing to perform the key functions using the non-programmable code.

19 Claims, 8 Drawing Sheets

(56) References Cited

U.S. PATENT DOCUMENTS

| | | | |
|---|---|---|---|
| 2009/0125897 A1* | 5/2009 | Matlin | G06F 8/65 717/168 |
| 2009/0125900 A1* | 5/2009 | Matlin | G06F 8/65 717/173 |
| 2012/0117365 A1 | 5/2012 | Navy | |
| 2013/0086571 A1 | 4/2013 | Dasari | |
| 2013/0167134 A1* | 6/2013 | Shim | H04W 12/06 717/173 |
| 2014/0281465 A1* | 9/2014 | Catherwood | G06F 9/4401 713/2 |

* cited by examiner

SYSTEM AND METHOD FOR UPDATING FIRMWARE IN REAL-TIME

BACKGROUND OF THE INVENTION

The present invention relates to a firmware controlled system and a method for updating firmware of the firmware controlled system.

Figure 1:
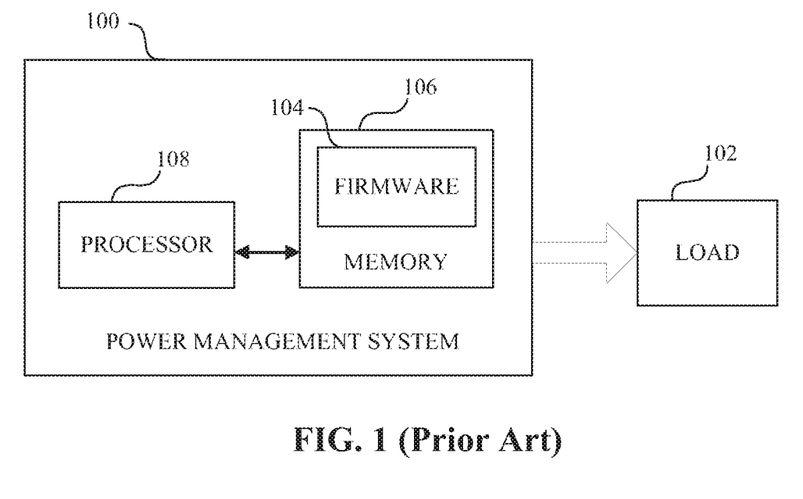
FIG. 1 is a schematic block diagram of a conventional power management system for providing power to a load.

FIG. 1 shows a firmware controlled system 100 for performing at least one key function and at least one normal function. The system 100 can be a power management system for providing power to a load 102, for example. The at least one key function of the system 100 includes one of a real-time control function, a critical system protection function, a system boot function, etc., and the at least one normal function of the system 100 includes one of a housekeeping function, a low priority communication function, a system initialization function, etc. The system 100 is controlled by firmware 104 stored in a memory 106 and executed by a processor 108.

Figure 2:
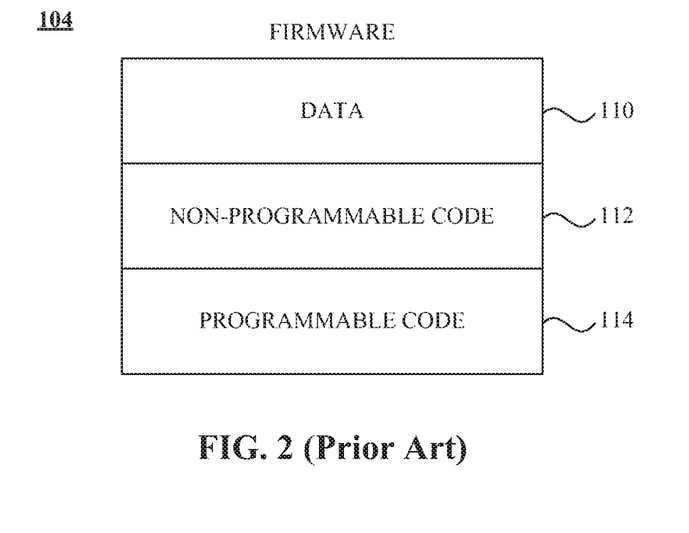
FIG. 2 shows a structure of firmware in the system of FIG. 1.

FIG. 2 shows a structure of the firmware 104 in the system 100. The firmware 104 includes firmware data 110, a set of non-programmable code 112 for performing the at least one key function, and a set of programmable code 114 for performing the at least one normal function. The set of non-programmable code is updated during firmware updating.

Figure 3:
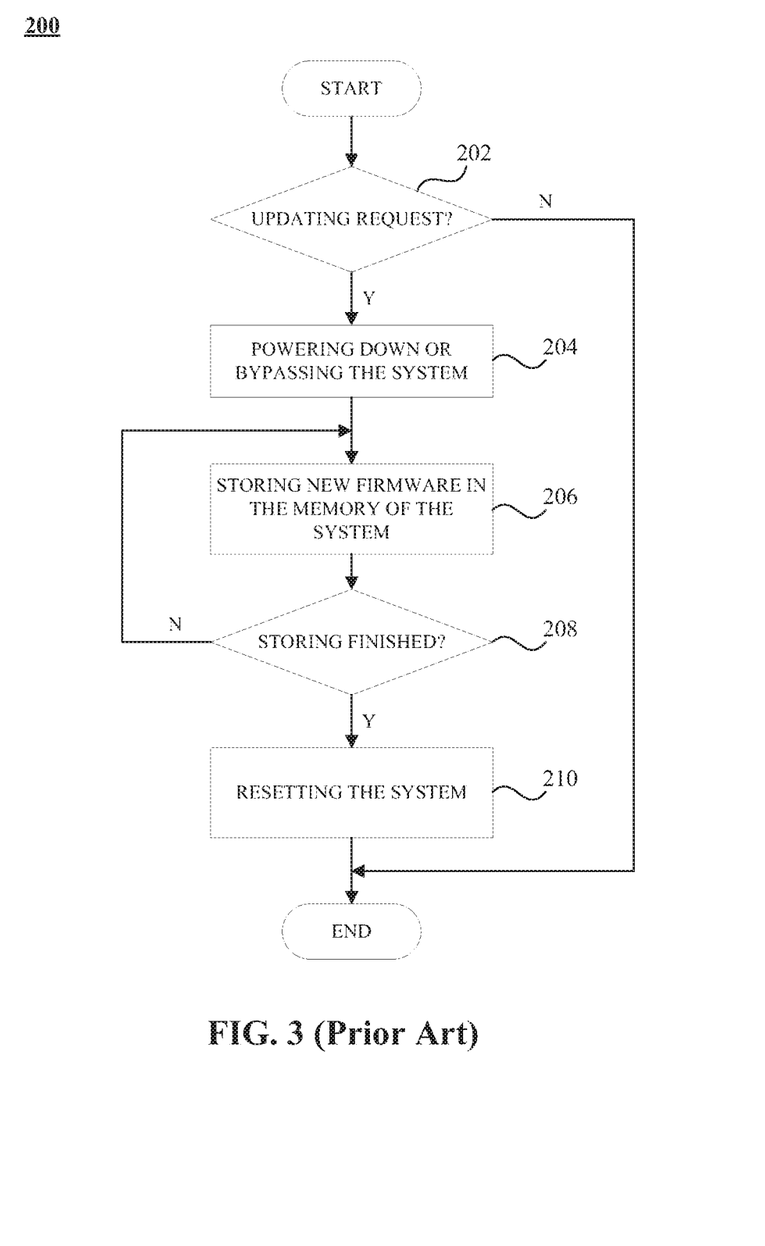
FIG. 3 is a flow chart of a conventional method of updating the firmware in the system of FIG. 1.

FIG. 3 shows a flow chart of a conventional method 200 of updating the firmware 104 of FIG. 1. Upon receipt of a firmware updating request at step 202, at step 204, the system 100 is required to be powered down or bypassed. At step 206, new firmware is stored in the memory 106, overwriting the firmware 104. After the new firmware is stored in the memory 106 at step 208, at step 210 the system 100 is reset to make sure that the new firmware operates properly. However, powering down and resetting the power management system 100 bring risk and high cost for continuous load operation requirements, especially for a critical load, such as a data server, medical equipment, traffic dispatching system, etc. It is therefore desirable to find a method for updating firmware in real-time to reduce the cost of redundant backup system investment.

BRIEF DESCRIPTION OF THE DRAWINGS

The invention, together with objects and advantages thereof, may best be understood by reference to the following description of preferred embodiments together with the accompanying drawings in which.

DETAILED DESCRIPTION OF PREFERRED EMBODIMENTS

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

In one embodiment, the present invention provides a system controlled by firmware, where the firmware includes a set of non-programmable code for performing at least one key function and a set of programmable code for performing at least one normal function. The system includes a memory having a first memory block for storing the set of non-programmable code, and second and third memory blocks including an active memory block and an inactive memory block. The active memory block stores a first set of programmable code that is executed by the system and the inactive memory block stores a second set of programmable code that is not currently being executed by the system. The system further includes a processor connected to the memory. The processor includes an input unit for receiving a new set of programmable code and a firmware updating request. The processor also includes a processing unit, connected to the input unit, for executing the set of non-programmable code and the first set of programmable code stored in the active memory block, and a programming unit, connected to the input unit. The programming unit identifies the inactive memory block and stores the new set of programmable code in the inactive memory block. After storing the new set of programmable code in the inactive memory block, the processing unit switches from executing the first set of programmable code stored in the active memory block to executing the new set of programmable code in the inactive memory block based on the firmware updating request.

In another embodiment, the present invention provides a method of updating firmware of a firmware controlled system, where the firmware includes a set of non-programmable code for performing at least one key function and a set of programmable code for performing at least one normal function. The system includes a memory having a first memory block for storing the set of non-programmable code, and second and third memory blocks including an active memory block that stores a first set of programmable code and an inactive memory block that stores a second set of programmable code, wherein the non-programmable code in the first memory block and the first set of programmable code stored in the active memory block are being executed by the system. The method includes identifying the inactive memory block, storing a new set of programmable code in the inactive memory block, and after storing the new set of programmable code, switching from executing the first set of programmable code stored in the active memory block to executing the new set of programmable code stored in the inactive memory block based on a firmware updating request, wherein the system continues to perform the at least one key function during the storing and switching steps.

Figure 4:
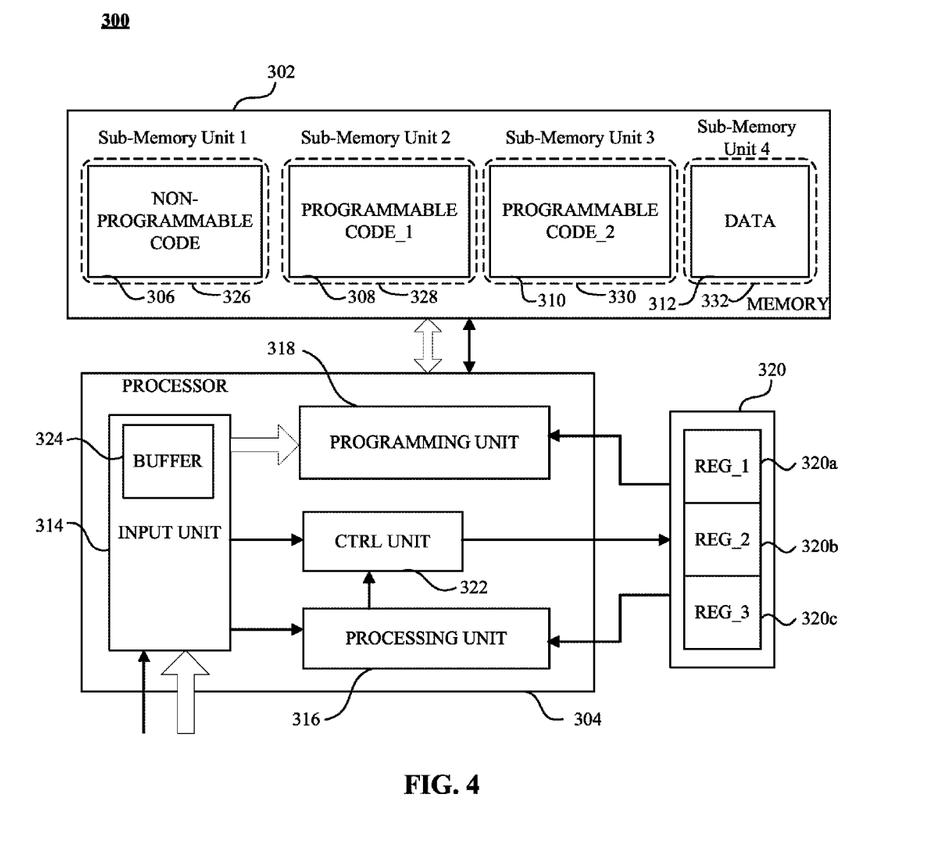
FIG. 4 is a schematic block diagram of a system for real-time firmware updating in accordance with an embodiment of the invention.

Referring now to FIG. 4, a block diagram of a firmware controlled system 300 for real-time firmware updating in accordance with an embodiment of the invention is shown. The firmware controlled system 300 includes a memory 302 and a processor 304 connected to the memory 302. The system 300 is controlled by firmware that includes a set of non-programmable code for performing at least one key function, a set of programmable code for performing at least one normal function, and a set of firmware data.

In a preferred embodiment, the memory 302 includes a first memory block 306 for storing the set of non-programmable code, second and third memory blocks 308 and 310 respectively for storing first and second sets of programmable code, and a fourth memory block 312 for storing the set of firmware data. In a preferred embodiment, the first and second sets of programmable code respectively include a set of essential data for executing the first and second sets of programmable code, such as some predefined initial value variables, constants in the first and second sets of programmable code. During operation, the second and third memory blocks include one active memory block in which the set of programmable code is currently being executed by the system 300, and one inactive memory block in which the set of programmable code is not being executed by the system 300. For example, if the first set of programmable code in the second memory block 308 is being executed by the system 300, the second memory block 308 is the active memory block and the third memory block 310 is the inactive memory block. The set of firmware data stored in the fourth memory block 312 includes a set of non-programmable data for the at least one key function and a set of programmable data for the at least one normal function.

The processor 304 includes an input unit 314 for receiving a new set of programmable code and a firmware updating request, and a processing unit 316, connected to the input unit 314, for executing the set of non-programmable code stored in the first memory block 306 and the first set of programmable code stored in the second memory block 308 which currently is the active memory block. In a preferred embodiment, the new set of programmable code includes a new set of essential data for executing the new set of programmable code, such as some predefined initial value variables, constants in the new set of programmable code. In a preferred embodiment, the firmware updating request includes a storing request for storing the new set of programmable code in the memory 302.

The processor 304 further includes a programming unit 318 connected to the input unit 314, wherein the programming unit 318 identifies that the third memory block 310 is the inactive memory block, and stores the new set of programmable code in the third memory block 310 based on the identifying. In a preferred embodiment, the firmware includes a boot loader of the system 100 so that the storing the new set of programmable code can be performed once a storing request is received from the input unit 314. The boot loader can be located in either the set of non-programmable code, or programmable code, such as the first and second sets of programmable code. The boot loader can be updated by firmware updating if the boot loader is located in the programmable code. The processor 304 preferably comprises a processor of an MCU (microcontroller unit) of the system 300, or alternatively could comprise a separate processor within the system 300.

In a preferred embodiment, the system 300 includes a plurality of registers 320 and a control unit 322 for setting the plurality of registers 320. The control unit 322 is connected to the input unit 314, the processing unit 316 and the plurality of registers 320. The registers 320 are preferably a part of the process 304 or a part of the memory 302. The plurality of registers 320 include a first register 320a for storing a first flag that indicates the active memory block. In a preferred embodiment, the control unit 322 sets the first flag by detecting the active memory block that is being accessed by the processing unit 316, so that the programming unit 318 identifies the inactive memory block based on the first flag. In a preferred embodiment, the programming unit 318 overwrites the second set of programmable code stored in the third memory block 310 while storing the new set of programmable code in the third memory block 310. In a preferred embodiment, the input unit 314 includes a buffer 324 for buffering a portion of the new set of programmable code, wherein the programming unit 318 stores the portion of the new set of programmable code in the inactive memory block after a predefined amount of the portion of the new set of programmable code is received in the buffer 324.

In a preferred embodiment, as shown in FIG. 4, the first through fourth memory blocks 306-312 are respectively located in four separate sub-memory units of the memory 302, including a first sub-memory unit 326 for storing the set of non-programmable code, which is preferably a one-time programmable read-only memory (OTPROM) for better data protection, second and third sub-memory units 328 and 330 for storing the first and second sets of programmable code, which are preferably Flash memory banks, and a fourth sub-memory unit 332 for storing the set of firmware data, which is preferably a random-access memory (RAM). This allows the system 300 to continue to perform the at least one key function and the at least one normal function with high execution efficiency by executing the set of non-programmable code in the first sub-memory unit 326 and the first set of programmable code in the second sub-memory unit 328 when the programming unit 318 is storing the new set of programmable code in the third sub-memory unit 330.

After storing the new set of programmable code in the third memory block 310, the processing unit 316 identifies the third memory block 310 as the inactive memory block and performs switching from executing the first set of programmable code stored in the second memory block 308 to executing the new set of programmable code in the third memory block 310. In a preferred embodiment, the firmware updating request further includes a firmware switching request, wherein the switching is initiated based on the firmware switching request. In another preferred embodiment, the switching is initiated automatically right after the new set of programmable code is stored in the third memory block 310. The switching includes disabling maskable interrupts and initializing vector base address (VBA) for the new set of programmable code and initializing the new set of programmable code in the third memory block 310, and after the switching, the first flag is changed by the control unit 322 to indicate the third memory block 310 as the active memory block and the second memory block 308 as the inactive memory block.

In a preferred embodiment, one of the second and third memory blocks 308 and 310 is configured as a default memory block, wherein the processing unit switches to execute the set of programmable code in the default memory block if the processing unit fails to identify the active memory block. In a preferred embodiment, the plurality of registers 320 include a second register 320b for storing a second flag that indicates the default memory block, wherein the second flag is set by the control unit 322 according to system configuration. The processing unit 316 identifies the default memory block based on the second flag.

In a preferred embodiment, the firmware updating request comprises a type of real-time updating request and a type of non-real-time updating request. Information of the type of the updating request is carried in the firmware storing request if the switching is initiated automatically right after the storing is completed, or in the firmware switching request. In a preferred embodiment, the registers 320 further includes a third register 320c for storing a third flag that indicates the updating request is the real-time updating request or the non-real-time updating request, wherein the control unit 322 sets the third flag upon receipt of the information of the type of the firmware updating request. In a preferred embodiment, the processing unit 316 disables all maskable interrupts except interrupts used in the non-programmable code during the switching if the third flag indicates the real-time updating request, and disables all maskable interrupts during the switching if the third flag indicates the non-real-time updating request. In another preferred embodiment, the processing unit 316 initializes the system 300 except the set of non-programmable code and the set of non-programmable data during said switching if the third flag indicates the real-time updating request, so that the system 300 continues to perform the at least one key function with the sets of non-programmable code and non-programmable data, and initializes the system 300 including the sets of non-programmable code and non-programmable data during the switching if the third flag indicates the non-real-time updating request, wherein the initializing the system 300 includes restarting the system 300.

In a preferred embodiment, the first set of programmable code and the new set of programmable code are respectively stored in the second and third sub-memory units 328 and 330 from a same address, so that the switching includes swapping the second and third sub-memory units 328 and 330 with each other.

Figure 5:
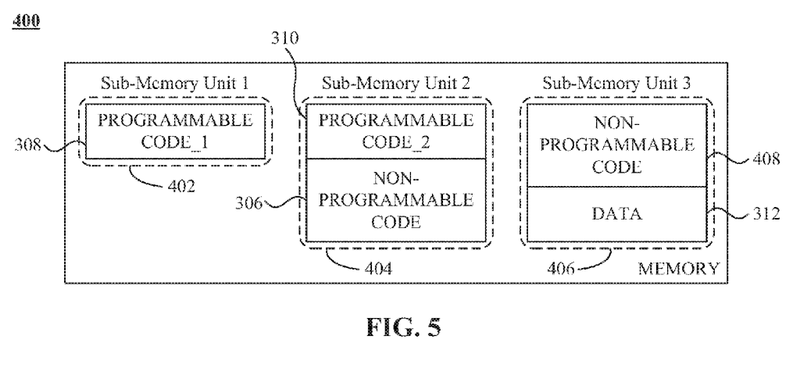
FIG. 5 is a block diagram of a memory of the system of FIG. 4 in accordance with another embodiment of the invention.

FIG. 5 is a block diagram of a memory 400 of the system 300 of FIG. 4 in accordance with another embodiment of the invention. The second and third memory blocks 308 and 310 that store first and second sets of programmable code are respectively located in first and second sub-memory units 402 and 404 of the memory 400. The first and second sub-memory units 402 and 404 are preferably Flash memory banks. The first memory block 306 that stores the set of non-programmable code is located in one of the first and second sub-memory units 402 and 404, for example, in the second sub-memory unit 404 as shown in FIG. 5. The fourth memory block 312, which stores the set of firmware data, is located in a third sub-memory unit 406 of the memory 400. The third sub-memory unit 406 is preferably a RAM, such as a dual-port RAM shared with code space and data space. In a preferred embodiment, the third sub-memory unit 406 includes a reserved memory block 408 for storing a copy of the set of non-programmable code, so that the system 300 continues to perform the at least one key function and the at least one normal function with high execution efficiency by executing the copy of the set of non-programmable code in the third sub-memory unit 406 and the first set of programmable code in the first sub-memory unit 402 when the programming unit 318 is storing the new set of programmable code in the third memory block 310 of the second sub-memory unit 404. In a preferred embodiment, the programming unit 318 stores the copy of the set of non-programmable code in the reserved memory block 408 before storing the new set of programmable code in the second sub-memory unit 404.

Figure 6:
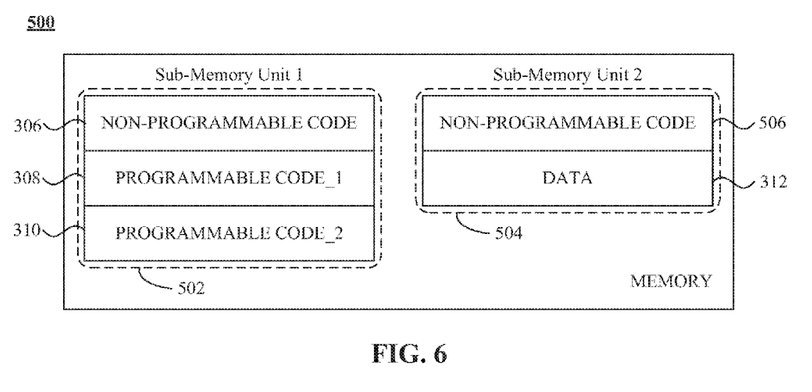
FIG. 6 is a block diagram of a memory of the system of FIG. 4 in accordance with yet another embodiment of the invention.

FIG. 6 is a block diagram of a memory 500 of the system 300 of FIG. 4 in accordance with yet another embodiment of the invention. The first, second and third memory blocks 306, 308 and 310 that store the set of non-programmable code and the first and second sets of programmable code are located in a first sub-memory unit 502 of the memory 500. The first sub-memory unit is preferably a Flash memory. The fourth memory block 312, which stores the set of firmware data, is located in a second sub-memory unit 504 of the memory 500. The second sub-memory unit 504 is preferably a RAM, such as a dual-port RAM shared with code space and data space. In a preferred embodiment, the second sub-memory unit 504 includes a reserved memory block 506 for storing a copy of the set of non-programmable code, so that the system 300 continues to perform the at least one key function with high execution efficiency by executing the copy of the set of non-programmable code in the reserved memory block 506 and the at least one normal function with low execution efficiency by executing the first set of programmable code in the second memory block 308 when the input unit 314 is buffering a portion of the new set of programmable code. In a preferred embodiment, the programming unit 318 stores the copy of the set of non-programmable code in the reserved memory block 506 before storing the new set of programmable code in the first sub-memory unit 502.

Figure 7:
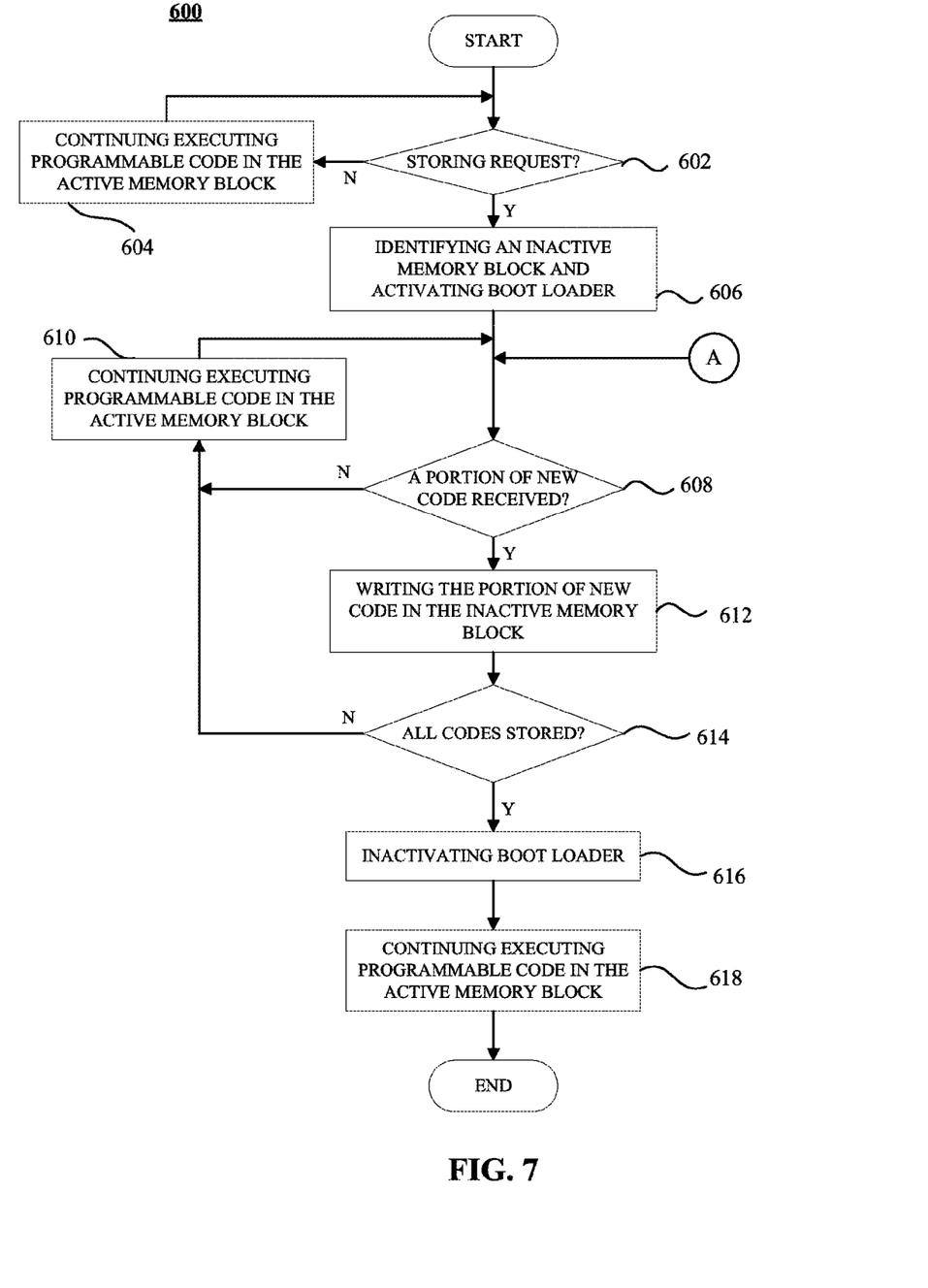
FIG. 7 is a flow chart of a method of storing a new set of programmable code of the firmware into the system of FIG. 4 having a memory of FIG. 4 or 5 in accordance with an embodiment of the invention.

FIG. 7 is a flow chart of a method 600 of storing a new set of programmable code of firmware into the firmware controlled system 300 of FIG. 4 having a memory of FIG. 4 or 5 in accordance with an embodiment of the invention. The firmware includes a set of non-programmable code for performing at least one key function and a set of programmable code for performing at least one normal function.

The system 300 as shown in FIG. 4 comprises a memory 302 including a first memory block 306 for storing the set of non-programmable code of the firmware, and second and third memory blocks 308 and 310 respectively storing first and second sets of programmable code of the firmware, and a processor 304 connected to the memory 302. During operation, the second and third memory blocks include one active memory block in which the set of programmable code is currently being executed by the processing unit 316, and one inactive memory block in which the set of programmable code is not being executed. For example, if the first set of programmable code in the second memory block 308 is being executed, the second memory block 308 is the active memory block and the third memory block 310 is the inactive memory block. In a preferred embodiment, the active memory block is indicated by the first flag stored in the first register 320a of the system 300.

Starting at step 602, the system 300 detects whether there is a firmware storing request. At step 604, if the firmware storing request is not received, the system 300 continues executing the programmable code in the active memory block, otherwise, at step 606, upon receipt of the firmware storing request, the programming unit 318 identifies that the third memory block 310 is the inactive memory block, and activates the boot loader of the firmware for storing a predefined amount of a portion of the new set of programmable code in the third memory block 310. In a preferred embodiment, the inactive memory block is identified based on the first flag.

At step 608, the processor 304 buffers a portion of the new set of programmable code until a predefined amount of the portion of the new set of programmable code is received, meanwhile at step 610, the processing unit 316 continues performing the at least one normal function by executing the first set of programmable code in the second memory block 308.

At step 612, once the predefined amount of the portion of the new set of programmable code is received in the buffer 324, the programming unit 318 stores the portion of the new set of programmable code in the third memory block 310. At step 614, the processing unit 316 detects whether all codes of the new set of programmable code have been stored in the third memory block 310, if not, going back to step 610 to continue executing the first set of programmable code in the second memory block 308 while the programming unit 318 is writing the portion of the new set of programmable code in the third memory block 310. In a preferred embodiment, the writing includes overwriting the second set of programmable code stored in the third memory block 310.

At step 616, after the system 300 completes storing the new set of programmable code in the third memory block 310, the system 300 inactivates the boot loader. At step 618, the system 300 continues to perform the at least one normal function by executing the first set of programmable code in the second memory block 308.

The system 300 continues performing the at least one key function at steps 602 through 618 by executing the non-programmable code stored in the first sub-memory unit 326 of the memory 300 in FIG. 4, or stored in the reserved memory blocks 408 in FIG. 5.

Figure 8:
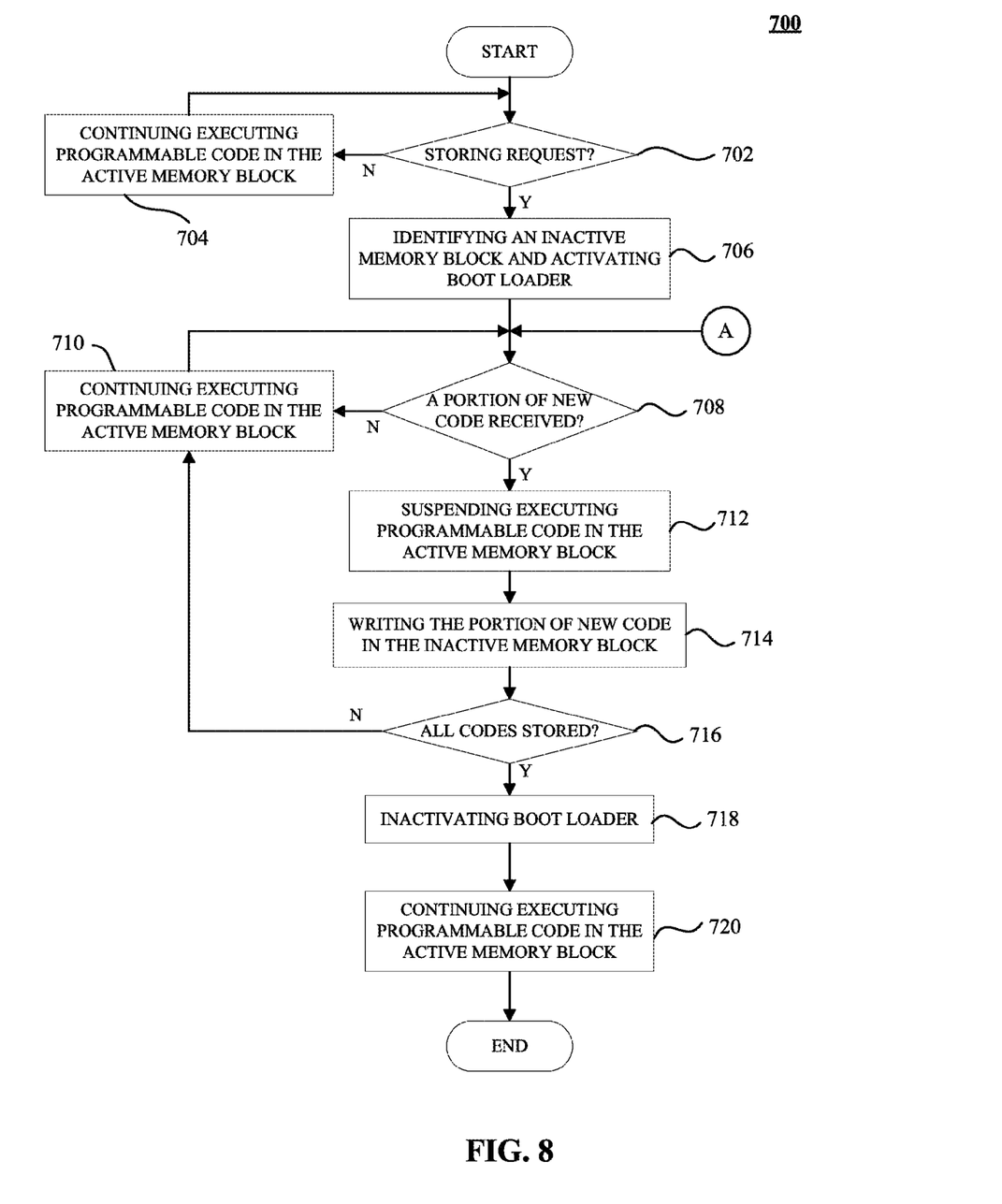
FIG. 8 is a flow chart of a method of storing a new set of programmable code of the firmware into the system of FIG. 4 having a memory of FIG. 6 in accordance with an embodiment of the invention.

FIG. 8 is a flow chart of a method 700 of storing a new set of programmable code of firmware into the firmware controlled system 300 of FIG. 4 having a memory of FIG. 6 in accordance with an embodiment of the invention. The firmware includes a set of non-programmable code for performing at least one key function and a set of programmable code for performing at least one normal function.

Similar to FIG. 7, starting at step 702, the system 300 detects whether there is a firmware storing request. At step 704, if the firmware storing request is not received, the system 300 continues executing the programmable code in the active memory block, otherwise, at step 706, upon receipt of the firmware storing request, the programming unit 318 identifies that the third memory block 310 is the inactive memory block, and activates the boot loader of the firmware for storing a predefined amount of a portion of the new set of programmable code in the third memory block 310. In a preferred embodiment, the inactive memory block is identified based on the first flag.

At step 708, the processor 304 buffers a portion of the new set of programmable code until a predefined amount of the portion of the new set of programmable code is received, meanwhile at step 710, the processing unit 316 continues performing the at least one normal function by executing the first set of programmable code in the second memory block 308.

At step 712, once the predefined amount of the portion of the new set of programmable code is received in the buffer 324, the processing unit 316 suspends executing the first set of programmable code in the second memory block 308, as the second memory block 308 and the third memory block 310 are located in the same first sub-memory unit 502 of the memory 500.

At step 714, the programming unit 318 stores the portion of the new set of programmable code in the third memory block 310.

At step 716, the processing unit 316 detects whether all codes of the new set of programmable code have been stored in the third memory block 310, if not, going back to step 710 to continue executing the first set of programmable code in the second memory block 308 while the programming unit 318 is writing the portion of the new set of programmable code in the third memory block 310. In a preferred embodiment, the writing includes overwriting the second set of programmable code stored in the third memory block 310.

At step 718, after the system 300 completes storing the new set of programmable code in the third memory block 310, the system 300 inactivates the boot loader. At step 720, the system 300 continues to perform the at least one normal function by executing the first set of programmable code in the second memory block 308.

The system 300 continues performing the at least one key function at steps 702 through 720 by executing the non-programmable code stored in the reserved memory blocks 506 in FIG. 6.

Figure 9:
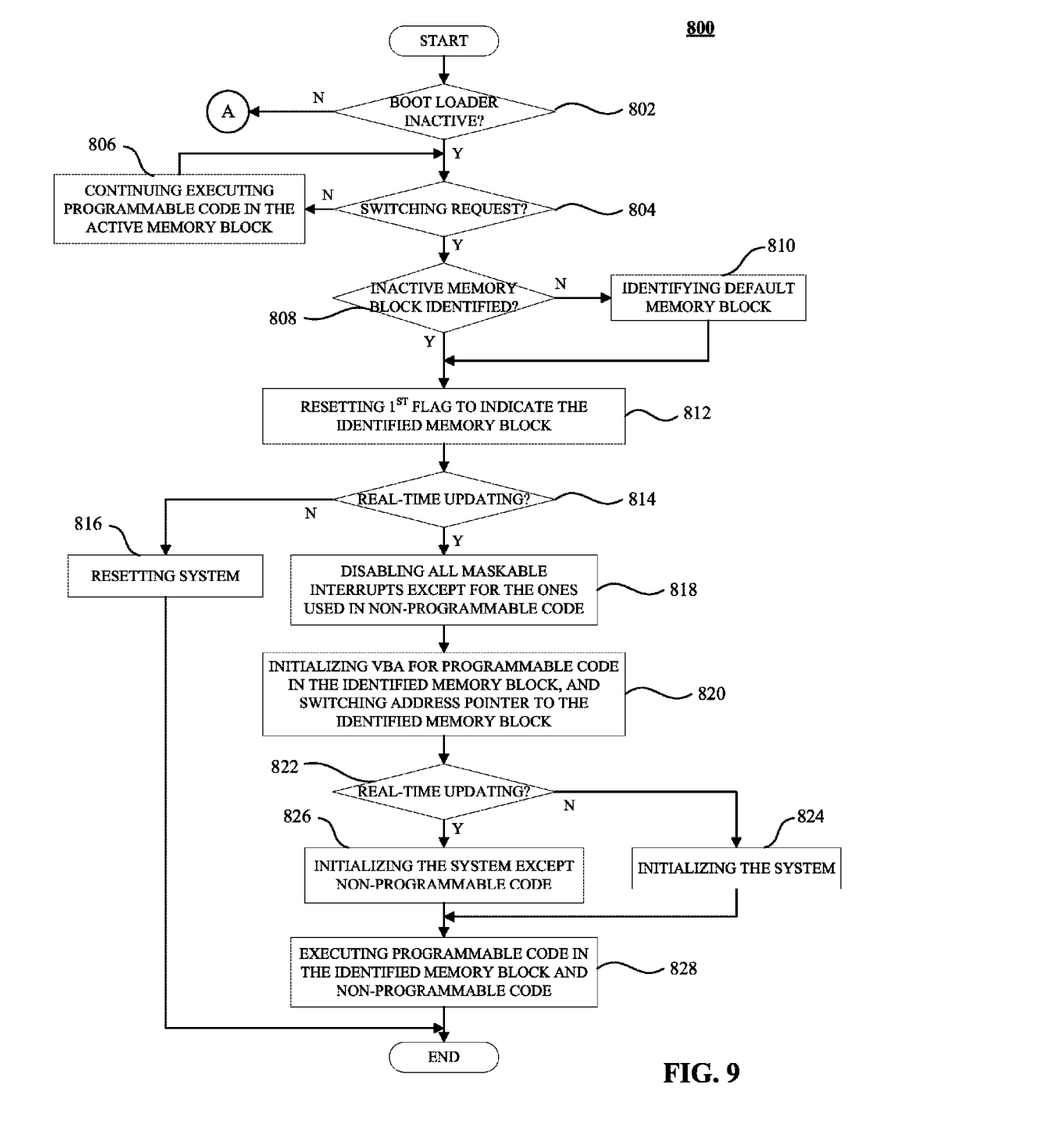
FIG. 9 is a flow chart of a method of switching the system of FIG. 4 to operate using new firmware in accordance with an embodiment of the invention.

FIG. 9 is a flow chart of a method 800 of switching the system 300 of FIG. 4 to operate using a new set of programmable code in accordance with an embodiment of the invention after storing the new set of programmable code in the inactive memory block as shown in FIG. 7 or 8 based on the firmware updating request.

After storing the new set of programmable code in the third memory block 310, the system 300 as shown in FIG. 4 comprises a memory 302 including a first memory block 306 for storing the set of non-programmable code of the firmware, and second and third memory blocks 308 and 310 respectively storing the first and new sets of programmable code of the firmware, and a processor 304 connected to the memory 302. During operation, the second memory block is the active memory block in which the first set of programmable code is currently being executed by the processing unit 316. In a preferred embodiment, the active memory block is indicated by the first flag stored in the first register 320a of the system 300.

In a preferred embodiment, the firmware updating request further includes a firmware switching request, wherein the switching is initiated based on the firmware switching request. In another preferred embodiment, the switching is initiated automatically right after the new set of programmable code is stored in the third memory block 310.

In a preferred embodiment, the firmware updating request comprises a type of real-time updating request and a type of non-real-time updating request. Information of the type of the updating request is carried with the firmware switching request. In a preferred embodiment, the registers 320 further includes a third register 320c for storing a third flag that indicates the type of the updating request between the real-time updating request and the non-real-time updating request, wherein the control unit 322 sets the third flag upon receipt of the information of the type of the firmware switching request.

Starting at step 802, the system 300 detects status of the boot loader. If the boot loader is active, which means the storing has not been completed, going back to step 608 of FIG. 7 or step 708 of FIG. 8, otherwise, at step 804, in a preferred embodiment, the system 300 detects whether a firmware switching request is received. If the firmware switching request is received, the system 300 detects information of the type of the firmware updating request carried in the firmware switching request and sets the third flag accordingly.

At step 806, if the firmware switching request is not received, the system 300 continues executing the programmable code in the active memory block.

At step 808, the processing unit 316 identifies that the third memory block 310 is the inactive memory block that the new set of programmable code has been stored therein. Thus, the third memory block 310 is an identified memory block. In a preferred embodiment, the inactive memory block is identified based on the first flag.

At step 810, if the processing unit 316 fails to identify the inactive memory block, the processing unit 316 identifies a default memory block between the second and third memory blocks 308 and 310 which is configured by the system 300. In a preferred embodiment, the default memory block is identified based on a second flag stored in the second register 320b of the system 300, for example, the second memory block 308 is configured as the default memory block. Thus, the second memory block 308 is an identified memory block.

At step 812, in a preferred embodiment, the control unit 322 resets the first flag to indicate that the identified memory block is the active memory block.

At step 814, the system 300 identifies the type of the firmware updating request based on the third flag. If the firmware updating request is a non-real-time updating request, the system 300 is reset at step 816, the resetting will be described in detail referring to FIG. 10.

At step 818, if the firmware updating request is a real-time updating request, the processing unit 316 disables all maskable interrupts except for the ones used in the set of non-programmable code so that the system 300 continues performing the at least one key function.

At step 820, the processing unit 316 initializes the vector base address (VBA) for the set of programmable code in the identified memory block preferably based on the first flag that has been reset at step 812, and switches an address pointer to the identified memory block. In a preferred embodiment, the address pointer is switched to a start address of the set of programmable code in the identified memory block to execute the new set of programmable code of the firmware.

At step 822, after switching the address pointer to the identified memory block, the system 300 detects the type of the firmware updating request based on the third flag.

At step 824, for a non-real-time updating request, the whole system is initialized, otherwise, at step 826, the system 300 is initialized except the set of non-programmable code and corresponding non-programmable data so that the system 300 continues to perform the at least one key function. In a preferred embodiment, the steps 824 and 826 further include clearing the third flag.

At step 828, the system 300 executes the set of programmable code in the identified memory block and the set of non-programmable code.

Figure 10:
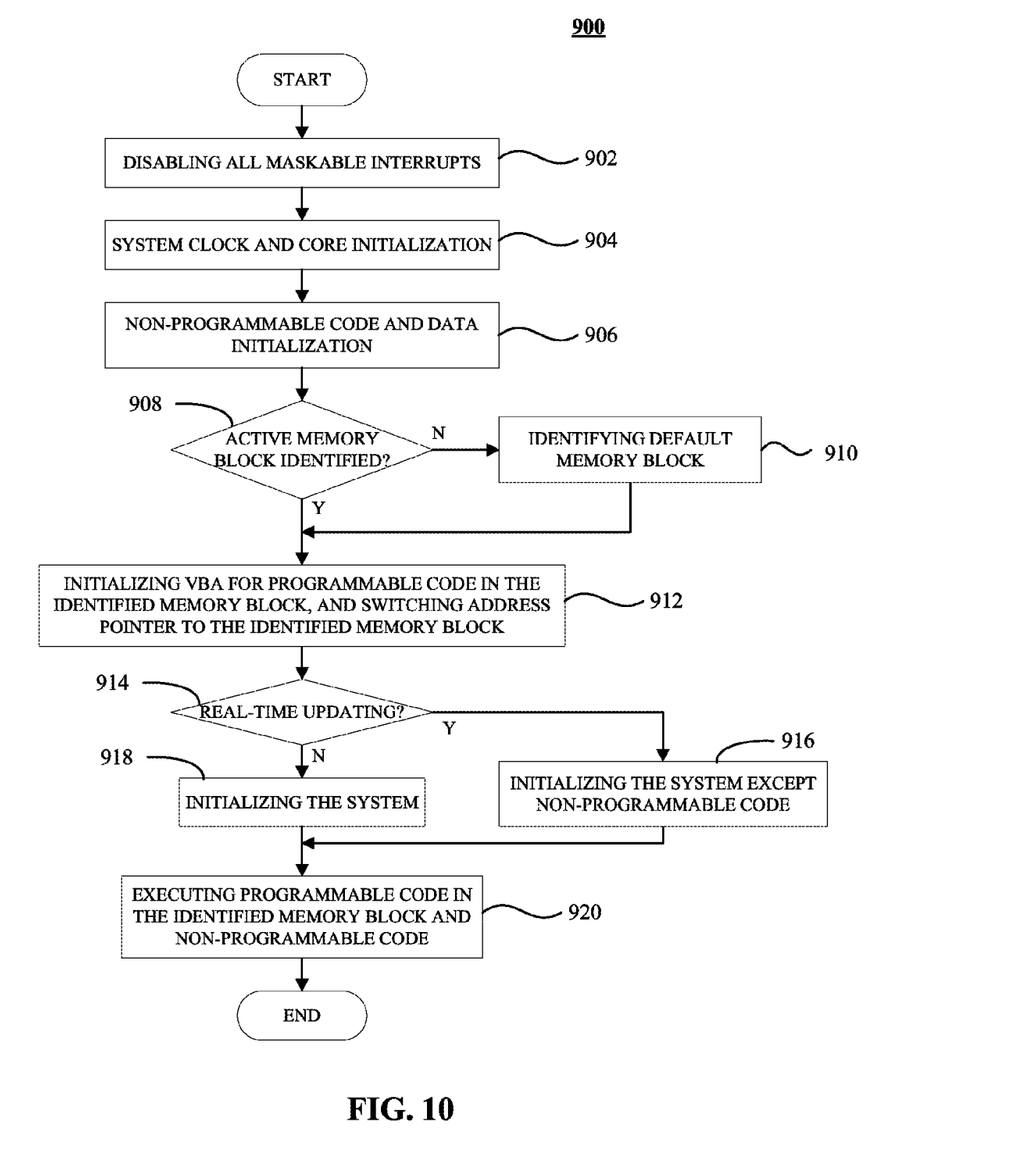
FIG. 10 is a flow chart of a method of resetting the system of FIG. 4 in accordance with an embodiment of the invention.

FIG. 10 is a flow chart of a method 900 of resetting the system 300 of FIG. 4 in accordance with an embodiment of the invention. The system 300 as shown in FIG. 4 comprises the memory 302 including the first memory block 306 for storing the set of non-programmable code of the firmware, and the second and third memory blocks 308 and 310 respectively storing the first and second sets of programmable code of the firmware, and the processor 304 connected to the memory 302. During operation, the second and third memory blocks include one active memory block in which the set of programmable code is currently being executed by the processor 304, and one inactive memory block in which the set of programmable code is not being executed. In a preferred embodiment, the system resetting is initiated by a firmware switching request of a non-real-time updating request, or automatically initiated right after a new set of programmable code has been stored in the inactive memory block under a non-real-time updating request, or other system reset events, such as power on reset, watchdog reset, external reset, etc.

Starting at step 902, all maskable interrupts are disabled. At steps 904 and 906, system clock and core, the set of non-programmable code in the first memory block 306 and the non-programmable data of the firmware in the fourth memory block 312 are initialized.

At step 908, the processing unit 316 identifies the active memory block based on the first flag that has been reset at step 812. For example, the third memory block 310 is identified as the active memory block, thus the third memory block 310 is an identified memory block. If the processing unit 316 fails to identify the active memory block, at step 910, the processing unit 316 identifies a default memory block between the second and third memory blocks 308 and 310 which is configured by the system 300. In a preferred embodiment, the default memory block is identified based on the second flag stored in the second register 320b of the system 300, for example, the second memory block 308 is configured as the default memory block. Thus, the second memory block 308 is an identified memory block.

At steps 912, the processing unit 316 initializes the vector base address (VBA) for the set of programmable code in the identified memory block, and switches an address pointer to the identified memory block. In a preferred embodiment, the address pointer is switched to a start address of the set of programmable code in the identified memory block to execute the set of programmable code of the firmware.

At step 914, after switching the address pointer to the identified memory block, the system 300 detects the type of the firmware updating request based on the third flag.

At step 916, for a real-time updating request, the system 300 is initialized except the set of non-programmable code and corresponding non-programmable data so that the system 300 continues to perform the at least one key function, otherwise, at step 918, the whole system is initialized. In a preferred embodiment, the steps 916 and 918 further include clearing the third flag.

At step 920, the system 300 executes the set of programmable code in the identified memory block and the set of non-programmable code.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A system controlled by a firmware, wherein the firmware comprises a set of non-programmable code to perform at least one key function and a set of programmable code to perform at least one normal function, the system comprising:
a memory including:
a first memory block that stores the set of non-programmable code of the firmware,
a second and third memory blocks that include an active memory block and an inactive memory block, wherein the active memory block stores a first set of programmable code of the firmware that is currently being executed by the system and the inactive memory block stores a second set of programmable code of the firmware that is not currently being executed by the system, and
a fourth memory block that stores firmware data, wherein the firmware data comprises a set of non-programmable data corresponding to the set of non-programmable code of the firmware and a set of programmable data corresponding to the set of programmable code of the firmware being executed by the system; and
a processor, connected to the memory, comprising:
an input unit that receives a new set of programmable code of the firmware and a firmware updating request,
a processing unit, connected to the input unit, that executes the set of non-programmable code of the firmware stored in the first memory block and the first set of programmable code of the firmware stored in the active memory block, and
a programming unit, connected to the input unit, that identifies the inactive memory block and stores the new set of programmable code of the firmware in the inactive memory block based on said identifying,
wherein after said storing the new set of programmable code of the firmware in the inactive memory block based on said identifying, the processing unit switches from executing the first set of programmable code of the firmware stored in the active memory block to executing the new set of programmable code of the firmware stored in the inactive memory block based on the firmware updating request, and
wherein the system continues to perform the at least one key function during said storing and switching steps.

2. The system of claim 1, wherein said storing includes removing the second set of programmable code of the firmware stored in the inactive memory block.

3. The system of claim 1, wherein the input unit comprises a buffer that buffers a portion of the new set of programmable code of the firmware, and wherein the programming unit stores the portion of the new set of programmable code of the firmware in the inactive memory block after a predefined amount of the portion of the new set of programmable code of the firmware is received in the buffer.

4. The system of claim 1, wherein one of the second and third memory blocks is configured as a default memory block, wherein the processing unit switches to execute the set of programmable code of the firmware in the default memory block if the processing unit fails to identify the active memory block.

5. The system of claim 4, further comprising a first register that stores a first flag that indicates the active memory block and a second register that stores a second flag that indicates the default memory block, wherein the processor further comprises a control unit, connected to the input unit and the processing unit, that sets the first and second flags, wherein the active and inactive memory blocks are identified based on the first flag, and wherein the default memory block is identified based on the second flag.

6. The system of claim 5, wherein the firmware updating request comprises a real-time firmware updating request and a non-real-time firmware updating request, wherein the system further comprises a third register that stores a third flag that indicates the firmware updating request is the real-time firmware updating request or the non-real-time firmware updating request, and wherein the control unit sets the third flag upon receipt of the firmware updating request.

7. The system of claim 6, wherein the processing unit disables all maskable interrupts except interrupts used in the non-programmable code of the firmware during said switching if the third flag indicates the real-time firmware updating request, and disables all maskable interrupts during said switching if the third flag indicates the non-real-time firmware updating request.

8. The system of claim 6, wherein the processing unit initializes the system except the non-programmable code of the firmware during said switching if the third flag indicates the real-time firmware updating request, and initializes the system during said switching if the third flag indicates the non-real-time firmware updating request.

9. The system of claim 1, wherein the memory further comprises a first sub-memory unit including the second memory block, a second sub-memory unit including the first and third memory blocks, and a third sub-memory unit including the fourth memory block and a reserved memory block that stores a copy of the set of non-programmable code of the firmware when the programming unit is storing the new set of programmable code of the firmware in the third memory block of the second sub-memory unit or the second memory block of the first sub-memory unit.

10. The system of claim 1, wherein the memory further comprises a first sub-memory unit including the first, second, and third memory blocks, and a second sub-memory unit including the fourth memory block and a reserved memory block that stores a copy of the set of non-programmable code of the firmware when the programming unit is storing the new set of programmable code of the firmware into one of the second and third memory blocks of the first sub-memory unit.

11. The system of claim 1, wherein the memory further comprises a plurality of sub-memory units, wherein the second and third memory blocks are located in two separate sub-memory units of the memory respectively, and the first set of programmable code of the firmware and the second set of programmable code of the firmware are respectively stored in the two separate sub-memory units of the memory from a same address, and wherein said switching includes swapping the two separate sub-memory units of the memory with each other.

12. A method of updating firmware of a firmware controlled system, wherein the firmware includes a set of non-programmable code to perform at least one key function and a set of programmable code to perform at least one normal function, and wherein the firmware controlled system comprises a memory including a first memory block that stores the set of non-programmable code of the firmware, a second and third memory blocks that include an active memory block storing a first set of programmable code of the firmware that is currently being executed by the firmware controlled system and an inactive memory block storing a second set of programmable code of the firmware that is not currently being executed by the firmware controlled system, and a fourth memory block that stores firmware data, wherein the firmware data comprises a set of non-programmable data corresponding to the set of non-programmable code of the firmware and a set of programmable data corresponding to the set of programmable code of the firmware being executed by the system, the method comprising:

receiving a new set of programmable code of the firmware and a firmware updating request;

executing the set of non-programmable code of the firmware stored in the first memory block and the first set of programmable code of the firmware stored in the active memory block;

identifying the inactive memory block;

storing the new set of programmable code of the firmware in the inactive memory block based on said identifying; and     after storing the new set of programmable code of the firmware in the inactive memory block based on said identifying, switching from executing the first set of programmable code of the firmware stored in the active memory block to executing the new set of programmable code of the firmware stored in the inactive memory block based on the firmware updating request,     wherein the firmware controlled system continues to perform the at least one key function during said storing and switching steps.

13. The method of claim 12, wherein said storing includes removing the second set of programmable code of the firmware stored in the inactive memory block.

14. The method of claim 12, further comprising buffering a portion of the new set of programmable code of the firmware in a buffer, and storing the portion of the new set of programmable code of the firmware in the inactive memory block after a predefined amount of the portion of the new set of programmable code of the firmware is received in the buffer.

15. The method of claim 12, further comprising configuring one of the second and third memory blocks as a default memory block, wherein said switching comprises switching to execute the set of programmable code of the firmware in the default memory block if failing to identify the active memory block.

16. The method of claim 15, wherein the active memory block is identified by reading a first flag that indicates the active memory block, and wherein the default memory block is identified by reading a second flag that indicates the default memory block.

17. The method of claim 12, wherein the firmware updating request comprises a real-time firmware updating request and a non-real-time firmware updating request, and wherein said switching comprises disabling all maskable interrupts except interrupts used in the non-programmable code of the firmware and initializing the firmware controlled system except for the non-programmable code of the firmware for the real-time firmware updating request, and disabling all maskable interrupts and initializing the firmware controlled system for the non-real-time firmware updating request.

18. The method of claim 12, wherein the first memory block and at least one of the second and third memory blocks are located in a first sub-memory unit of the memory, and wherein the method further comprises copying the non-programmable code of the firmware to a reserved memory block of a second sub-memory unit of the memory before said storing.

19. The method of claim 12, wherein the second and third memory blocks are respectively located in separate sub-memory units of the memory, wherein the first set of programmable code of the firmware and the second set of programmable code of the firmware are respectively stored in the separate sub-memory units of the memory from a same address, and wherein said switching includes swapping the separate sub-memory units of the memory with each other.

\* \* \* \* \*